US009740978B2

(12) United States Patent
Hassanzadeh et al.

(10) Patent No.: US 9,740,978 B2
(45) Date of Patent: *Aug. 22, 2017

(54) PRODUCING CLUSTERED TOP-K PLANS

(71) Applicant: International Business Machines Corporation, Armonk, NY (US)

(72) Inventors: Oktie Hassanzadeh, Port Chester, NY (US); Anton V. Riabov, Ann Arbor, MI (US); Shirin Sohrabi Araghi, Port Chester, NY (US); Octavian Udrea, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

This patent is subject to a terminal disclaimer.

(21) Appl. No.: 14/525,790

(22) Filed: Oct. 28, 2014

(65) Prior Publication Data

US 2016/0321544 A1 Nov. 3, 2016

(51) Int. Cl.
*G06N 5/00* (2006.01)
*G06N 5/02* (2006.01)
*G06N 99/00* (2010.01)
*G06F 17/30* (2006.01)

(52) U.S. Cl.
CPC ....... *G06N 5/022* (2013.01); *G06F 17/30598* (2013.01); *G06N 99/005* (2013.01)

(58) Field of Classification Search
CPC .................................................. G06N 99/005
See application file for complete search history.

(56) References Cited

U.S. PATENT DOCUMENTS

| 5,122,801 A | 6/1992 | Hughes |
| 5,508,928 A | 4/1996 | Tran |
| 7,370,022 B2 | 5/2008 | Gupta et al. |
| 8,799,189 B2 | 8/2014 | Schwoegler et al. |
| 2001/0049793 A1 | 12/2001 | Sugimoto |
| 2006/0106477 A1 | 5/2006 | Miyashita |
| 2008/0071716 A1 | 3/2008 | Anderson et al. |
| 2015/0339582 A1* | 11/2015 | Riabov ............. G06N 5/04 706/11 |

OTHER PUBLICATIONS

List of IBM Patents or Patent Applications Treated as Related, Oct. 28, 2014, 2 pages.

(Continued)

*Primary Examiner* — Stanley K Hill
*Assistant Examiner* — Ola Olude Afolabi
(74) *Attorney, Agent, or Firm* — Francis Lammes; Stephen J. Walder, Jr.; Kurt P. Goudy

(57) ABSTRACT

A mechanism is provided for identifying a set of top-m clusters from a set of top-k plans. A planning problem and an integer value k indicating a number of top plans to be identified are received. A set of top-k plans are generated with at most size k, where the set of top-k plans is with respect to a given measure of plan quality. Each plan in the set of top-k plans is clustered based on a similarity between plans such that each cluster contains similar plans and each plan is grouped only into one cluster thereby forming the set of top-m clusters. A representative plan from each top-m cluster is presented to the user.

19 Claims, 11 Drawing Sheets

(56) References Cited

OTHER PUBLICATIONS

"Google Maps", https://www.google.com/maps/@31.168934,-100.0768425,6z, retrieved Sep. 11, 2014, 1 page.
Aljazzar, Husain et al., "K: A Heuristic Search Algorithm for Finding the k Shortest Paths", Artificial Intelligence, Jul. 14, 2011, 39 pages.
Aslam, Javed A. et al., "The Star Clustering Algorithm for Static and Dynamic Information Organization", Journal of Graph Algorithms and Applications, vol. 8, No. 1, Revised Aug. 2004, pp. 95-129.
Botea, Adi et al., "Path Planning with Compressed All-Pairs Shortest Paths Data", Proceedings of the Twenty-Third International Conference on Automated Planning and Scheduling (ICAPS), http://www.aaai.org/ocs/index.php/ICAPS/ICAPS13/paper/viewFile/6002/6191, Rome, Italy, Jun. 10-14, 2013, 293-297.
Bryce, Daniel, "Landmark-Based Plan Distance Measures for Diverse Planning", Proceedings of the 24th International Conference on Automated Planning and Scheduling (ICAPS), Portsmouth, New Hampshire, Jun. 21-26, 2014, pp. 56-64.
Chaudhuri, Surajit et al., "Robust and Efficient Fuzzy Match for Online Data Cleaning", SIGMOD 2003, San Diego, California, Jun. 9-12, 2003, 12 pages.
Coman, Alexandra et al., "Generating Diverse Plans Using Quantitative and Qualitative Plan Distance Metrics", Proceedings of the Twenty-Fifth AAAI Conference on Artificial Intelligence, San Francisco, California, Aug. 7-11, 2011, pp. 946-951.
Eppstein, David, "Finding the k Shortest Paths", Department of Information and Computer Science, http://www.ics.uci.edu/~eppstein/pubs/Epp-SJC-98.pdf, Mar. 31, 1997, 26 pages.
Filippone, Maurizio et al., "A survey of kernel and spectral methods for clustering", Pattern Recognition, vol. 41, Issue 1, http://lagis-vi.univ-lille1.fr/~lm/classpec/publi_classif/A_survey_of_kernel_and_spectral_methods_for_clustering_PR_2008.pdf, Jan. 2008, pp. 176-190.
Hassanzadeh, Oktie et al., "Creating probabilistic databases from duplicated data", VLDB Journal, vol. 18, No. 5, Oct. 2009, pp. 1141-1166.
Hassanzadeh, Oktie et al., "Framework for Evaluating Clustering Algorithms in Duplicate Detection", VLDB'09, Lyon, France, Aug. 24-28, 2009, 12 pages.
Hoffman, Walter et al., "A Method for the Solution of the Nth Best Path Problem", Journal of the ACM, vol. 6(4), Oct. 1959, pp. 506-514.
Khouadjia, Mostepha et al., "Pareto-Based Multiobjective AI Planning", Proceedings of the Twenty-Third International Joint Conference on Artificial Intelligence, Beijing, China, Aug. 3-9, 2013, pp. 2321-2327.
Myers, Karen L. et al., "Generating Qualitatively Different Plans through Metatheoretic Biases", In Proceedings of the 16th National Conference on Artificial Intelligence, (AAAI-99), Orlando, Florida, Jul. 18-22, 1999, 7 pages.
Nau, Dana S. et al., "Automated Planning—Theory and Practice", http://www.cs.umd.edu/~nau/planning/slides/, Elsevier, May 2004, 1 page.
Nguyen, Tuan A. et al., "Generating diverse plans to handle unkown and partially known user preferences", Artificial Intelligence (AU), vol. 190, Oct. 2012, pp. 1-31.
Riabov, Anton V. et al., "New Algorithms for the Top-K Planning Problem", Proceedings of the Scheduling and Planning Applications Workshop (SPARK) at the 24th International Conference on Automated Planning and Scheduling (ICAPS), Jun. 21-26, 2014, 7 pages.
Roberts, Mark et al., "Evaluating Diversity in Classical Planning", Proceedings of the 24th International Conference on Automated Planning and Scheduling (ICAPS), Portsmouth, New Hampshire, Jun. 21-26, 2014, 9 pages.
Sohrabi, Shirin et al., "Hypothesis Exploration for Malware Detection using Planning", Proceedings of the Twenty-Seventh AAAI Conference on Artificial Intelligence, Jul. 2013, pp. 883-889.
Srivastava, Biplav et al., "Domain Independent Approaches for Finding Diverse Plans", Proceedings of the Twentieth International Joint Conference on Artificial Intelligence, IJCAI-07, Hyderabad, India, Jan. 6-12, 2007, 7 pages.
Sroka, Michal et al., "Exploring Metric Sensitivity of Planners for Generation of Pareto Frontiers", in Proc. of the 6th Starting AI Researchers' Symposium (STAIRS), Aug. 2012, pp. 306-317.
Xu, Rui et al., "Survey of Clustering Algorithms", IEEE Transactions on Neural Networks, vol. 16, No. 3, May 2005, pp. 645-678.
Youngren, Mark A. et al., "The Future Theater-Level Model: A Research Project Update", Proceedings of the 1994 Winter Simulation Conference; http://www.informs-sim.org/wsc94papers/1994_0121.pdf, Orlando, Florida, Dec. 11-14, 1994, pp. 829-834.
Zhu, Andy D. et al., "Shortest Path and Distance Queries on Road Networks: Towards Bridging Theory and Practice", arXiv:1304.2576v2 [cs.DS], http://arxiv.org/pdf/1304.2576v2.pdf, Apr. 24, 2013, 22 pages.
List of IBM Patents or Patent Applications Treated as Related, Jun. 22, 2015, 2 pages.

\* cited by examiner

PRODUCING CLUSTERED TOP-K PLANS

GOVERNMENT RIGHTS

This invention was made with Government support under Contract No.: H98230-11-C-0276 awarded by the U.S. Department of Defense. The Government has certain rights in this invention.

BACKGROUND

The present application relates generally to an improved data processing apparatus and method and more specifically to mechanisms for producing clustered top-k plans.

Automated planning and scheduling is a branch of artificial intelligence (AI) that concerns the realization of strategies or action sequences, typically for execution by intelligent agents, autonomous robots, and unmanned vehicles. Unlike classical control and classification problems, solutions are complex and must be discovered and optimized in multidimensional space. Planning is also related to decision theory. Planning may be performed such that solutions may be found and evaluated prior to execution; however, any derived solution often needs to be revised. Solutions usually resort to iterative trial and error processes commonly seen in artificial intelligence. These include dynamic programming, reinforcement learning, and combinatorial optimization.

A planning problem generally comprises the following main elements: a finite set of facts, the initial state (a set of facts that are true initially), a finite set of action operators (with precondition and effects), and a goal condition. An action operator maps a state into another state. In the classical planning, the objective is to find a sequence of action operators (or planning action) that, when applied to the initial state, will produce a state that satisfies the goal condition. This sequence of action operators is called a plan.

SUMMARY

In one illustrative embodiment, a method, in a data processing system, is provided for identifying a set of top-m clusters from a set of top-k plans. The illustrative embodiment receives a planning problem and an integer value k indicating a number of top plans to be identified. The illustrative embodiment generates the set of top-k plans with at most size k, where the set of top-k plans is with respect to a given measure of plan quality. The illustrative embodiment clusters each plan in the set of top-k plans based on a similarity between plans such that each cluster contains similar plans and each plan is grouped only into one cluster thereby forming the set of top-m clusters. The illustrative embodiment presents a representative plan from each top-m cluster to the user.

In other illustrative embodiments, a computer program product comprising a computer useable or readable medium having a computer readable program is provided. The computer readable program, when executed on a computing device, causes the computing device to perform various ones of; and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
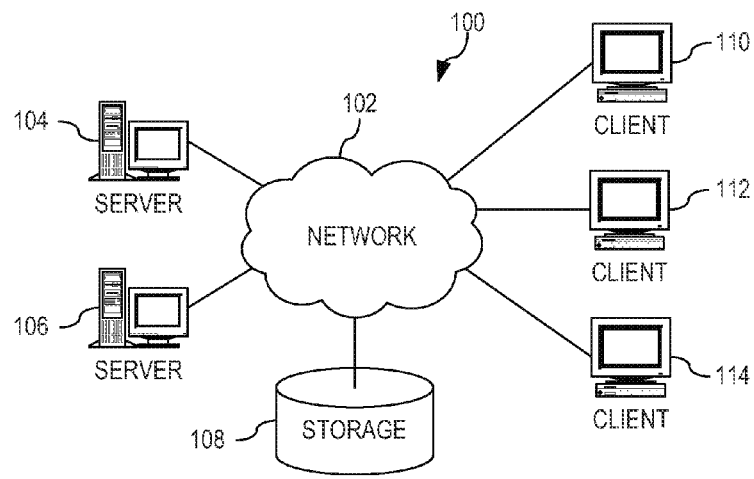
FIG. 1 is an example diagram of a distributed data processing system in which aspects of the illustrative embodiments may be implemented.

Automated planning and scheduling is a branch of artificial intelligence (AI) that concerns the realization of strategies or action sequences. A planning problem generally includes the following main elements: a finite set of facts, the initial state (a set of facts that are true initially), a finite set of action operators (with precondition and effects), and a goal condition. An action operator maps a state into another state. In the classical planning, the objective is to find a sequence of action operators (or planning action) that, when applied to the initial state, will produce a state that satisfies the goal condition. This sequence of action operators may be referred to as a plan.

There are many extensions to the classical planning problem. The illustrative embodiments are directed to identifying high-quality plans rather than identifying just any plan, as well as identifying a cost associated with action operators utilized in identifying the plan. That is, in the classical planning problem, quality often means shortest plan. Therefore, the best plan, the optimal plan, or the highest-quality plan often means a plan with smallest number of action operators. However, the illustrative embodiments associate a cost with each action operator, where the cost associated with each action operator is a penalty identified by a numerical value. Hence, the cost of the plan may be calculated by summing up the cost (i.e., the numerical value) of each action operator in the plan. Consequently, high-quality plans are those with the lowest cost and a top subset (k) of those plans, i.e. top-k plans, are the best k plans with the lowest cost.

Therefore, the illustrative embodiments provide for identifying a set of top-k plans based on the quality of each plan in a set of plans and, amongst the identified set of top-k plans, identifying one or more clusters, i.e. top-m clusters, from the set of top-k plans. In particular, the illustrative embodiments identify a set of k distinct plans with a lowest cost, where the k distinction plan includes both optimal plans and near-optimal plans, depending on k, and, by definition, for each plan in this set all valid plans of lower cost must also be in the set. The top-k plans are then ranked based on each plans associated quality, i.e. the cost associated with the plan, where the lowest cost identifies the highest quality. The top-k plans are then grouped using clustering techniques into top-m, clusters, with a representative set of each cluster being presented with an option of viewing all plans within that cluster.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the an in view of the present description that there are many other alternative implementations for these various elements that may be utilized in addition to, or in replacement of, the examples provided herein without departing from the spirit and scope of the present invention.

Figure 2:
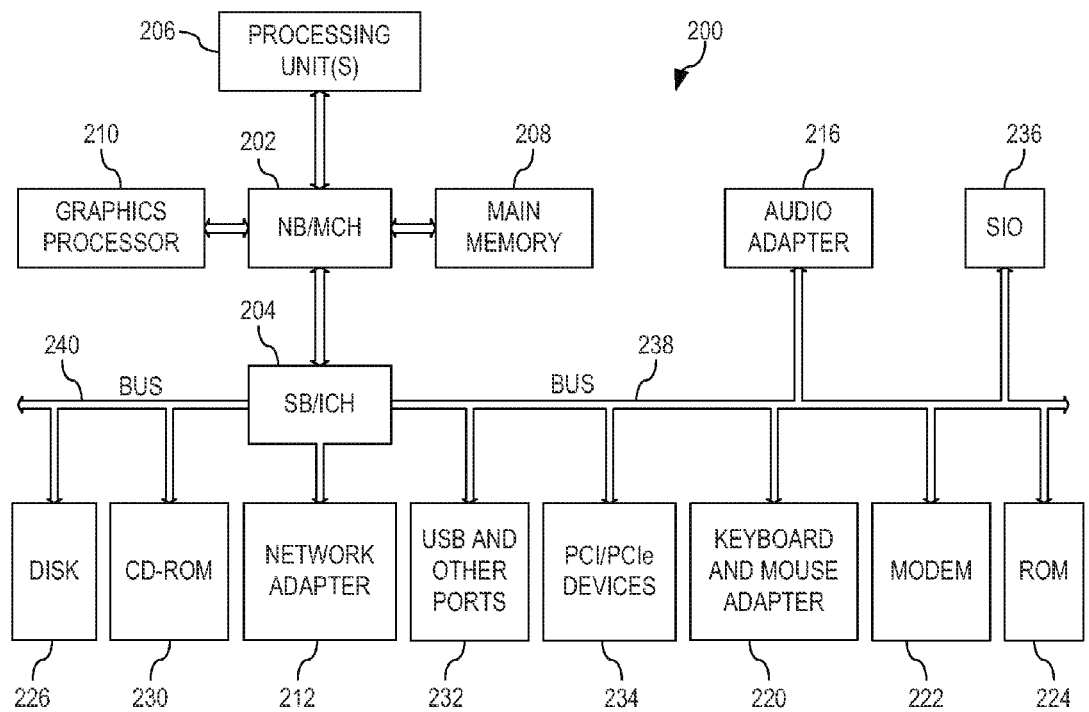
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication tines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/Mal 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SNIP) system including a plurality of processors in processing unit 206. Alternatively, a single processor system may be employed.

Instructions for the operating system, the object-oriented programming system, and applications or programs are located on storage devices, such as RIM 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
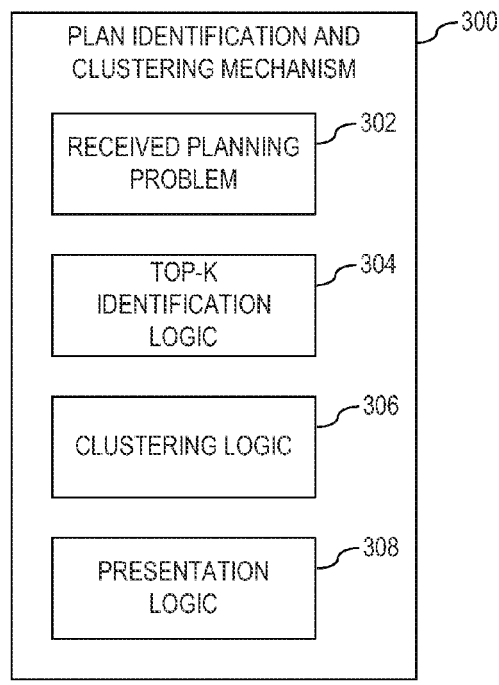
FIG. 3 depicts a functional block diagram of such a plan identification and clustering mechanism in accordance with an illustrative embodiment.

In order to identify a top subset (k) of a set of high-quality plans based on the quality of each plan in a set of plans and, amongst the identified top-k plans, identify one or more clusters (m) from the set of top-k plans, the illustrative embodiment provides a plan identification and clustering mechanism that identifies a set of k distinct plans with a lowest cost, ranks the identified top-k plans based on an associated quality, and then groups the top-k plans using clustering techniques forming a set of top-m clusters. FIG. 3 depicts a functional block diagram of such a plan identification and clustering mechanism in accordance with an illustrative embodiment. The functional block diagram of FIG. 3 may be implemented, for example, by one or more of the computing devices illustrated in FIG. 1 and/or data processing system 200 of FIG. 2. In the initialization of plan identification and clustering mechanism 300, plan identification and clustering mechanism 300 receives a planning problem.

The planning problem, in at least one embodiment, includes a finite set of facts, the initial state (a set of facts that are true initially), a finite set of action operators (with precondition and effects), and a goal condition. This planning problem may be described in, for example, a standard planning language called. PDDL (PDDL—Planning Domain Definition Language) or similar.

There are many problems that may be described in a planning problem. For example, travel planning may be described as a planning problem where the initial state is the set of facts true initially, for example, the agent's current location and the amount of money he/she is willing to spend. The set of actions will include the different modes for transportation that will take the agent to various locations. The goal condition will be the agent's desired location. Other problems such as the logistic problem (the problem of transporting packages from an initial location to the goal location using various ways of transportation) can also be described in a planning problem. Received planning problem 302 may hence come from different problems. In one embodiment, received planning problem 302 may be a travel domain or the logistic domain. In further embodiment, received planning problem 302 may be based on a hypothesis generation problem.

Several application scenarios require the construction of hypotheses presenting alternative explanation of a sequence of possibly unreliable observations. For example, the evolution of the state of the patient over time in an Intensive Care Unit (ICU) of a hospital may be inferred from a variety of measurements. A patient in typical ICU settings is connected to several monitoring devices that measure different physiological attributes such as the patient's blood pressure, heart rate, and temperature. The analysis of these raw streams of data results in semantically meaningful observations about the patient. For example, given the patient's heart rate, their respiration rate, and their body temperature, which are measured continuously, and also their white blood cell count obtained from blood analysis, the Systemic Inflammatory Response Syndrome (SIRS) score (integer that takes values between 0 and 4) may be computed as a meaningful observation about the patient's health. Observations may also include other measurements provided by physicians. The hypotheses, represented as a sequence of changes in patient state, aim to present an explanation for these observations, while providing deeper insight into the actual underlying causes for these observations, helping to make decisions about further testing, treatment or other actions. Similarly, as another example, observations from network traffic may indicate possible malware.

Key characteristics of hypotheses generation applications is that the true state of monitored patients, network hosts, or other entities, while essential for timely detection and prevention of critical conditions, is not directly observable. Instead, a sequence of available observations must be analyzed to re-construct the true state. To make this possible, a model of the entity consisting of states, transitions between states, and many-to-many correspondence between states and observations is given by a domain expert. However, this model may still not be complete. Furthermore, the set of observations may be incomplete, ambiguous (indicative of multiple states), and some observations may be missing.

At a high level, plan identification and clustering mechanism 300 receives a set of observations (or a trace) and description of the model (or a set of lifecycle state transition models of the system) and produces a set of plausible hypotheses, which explain observations by underlying state transitions that happen according to a model of a system. In at least one embodiment, plan identification and clustering mechanism 300 may encode the planning problem as received planning problem 302.

To illustrate how received planning problem 302 may be realized in practice, an assumption that the model of the system is provided in at least one embodiment in a simpler, less expressive language than a planning language (PDDL) that will be called LTS++, but the approach may be generalized to more complex PDDL models of state transitions, LTS++ is a language derived from LTS (Labeled Transition System) for defining models for hypothesis generation, and associating observation types with states of the lifecycle. The following examples utilize LTS++ for illustrative purposes although other languages may be used instead.

Figure 4:
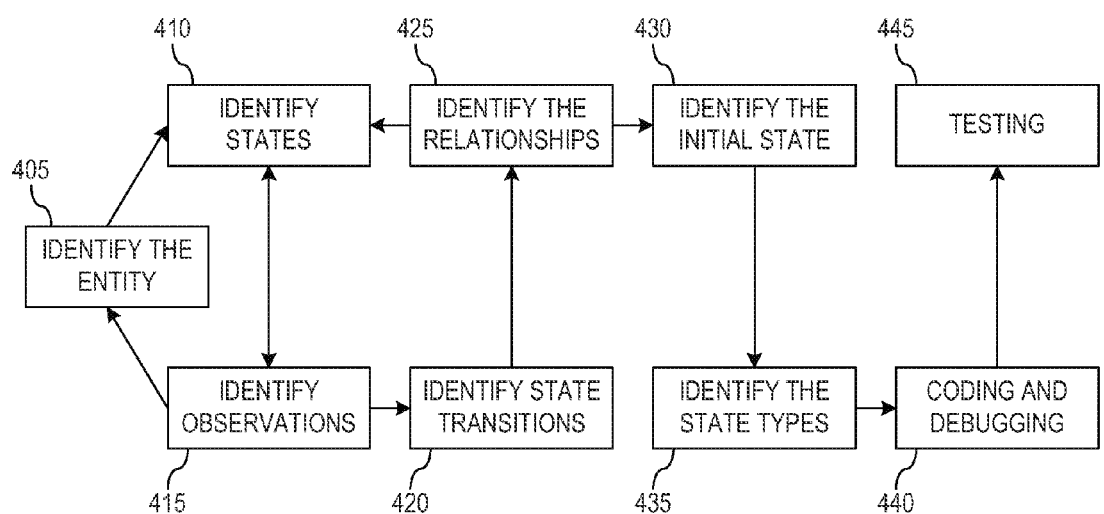
FIG. 4 illustrates a creation of a model description (in at least one embodiment is LTS++ (Labeled Transition System)) by the automated data analysis system in accordance with an illustrative embodiment.

FIG. 4 illustrates a creation of a LTS++ model by the automated data analysis system in accordance with an illustrative embodiment. The arrows are intended to indicate the most typical transitions between steps: transitions that are not shown are not prohibited. This process and the arrows between the processes help provide guidance in developing an LTS++ model. In at least one embodiment, as part of the steps, the automated data analysis system translates the identifications into the LTS++ syntax. In at least one embodiment, a user, for example, identifies at least one entity in the model at 405. This may depend on the objective of the hypothesis generation problem, the available data, and the available actions. For example, in the malware detection problem, the entity is the host, while in the intensive care delivery problem the entity is the patient.

A domain expert, for example, then identifies one or more states of the entity at 410. The states of a patient, for example, could be DCI (Delayed Cerebral Ischemia), infection, and high risk. Since the state transition model is manually specified and contains a fixed set of observation types, while potentially trying to model an open world with an unlimited number of possible states and observations, the model may be incomplete at any time, and may not support precise explanations for all observation sequences. To address this, and provide feedback to model designers about states that may need to be added, a hierarchical decomposition of states is used in at least one embodiment.

In at least one further embodiment, a designation of a subset of the state transition system is allowed as a hyperstate. In this case, if a transition through one or several states of the hyperstate is required, but no specific observation is associated with the transition, the hyperstate itself is included as part of the hypothesis, indicating that the model may have a missing state within the hyperstate, and that state in turn may need a new observation type associated with it. In the malware detection problem, the infection, exploit, cc_rendevouz are examples of hyperstates.

The domain expert then identifies a set of observations for the particular problem at 415. The available data, the entity, and the identified states may help define and restrict the space of observations. The domain expert then identifies possible transitions between states at step 420. In at least one embodiment, the possible transitions include all known transitions. This may be a tedious task for the domain expert to compile, depending on the number of states. However, hyperstates may be used to help manage these transitions. Any transition of the hyperstates is carried out to its substates. The user or the domain expert then identifies one or more associations between observations and states at 425.

In an optional embodiment, the domain expert identifies or designates an initial state as a starting state at step 430. The domain expert may also create a separate starting state that indicates a one of notation by transitioning to multiple states where the system receives the starting state. For example, in the malware detection problem, the starting state "start" indicates a "one of" notation as it transitions to both "CC" and "INFECTION."

The user or domain expert then provides an indication about each state type that indicates that some states are more plausible than the others at 435. In a further embodiment, the indication is a score value (or plan cost) for each state type. In a further embodiment, state types are related to the "good" versus "bad" behaviors and they influence the ranking between hypotheses. For example, the hypothesis that the host is crawling is more plausible than there being an infection for the same trace which may be explained by both hypotheses.

Once the states, observations, relationships, transitions, one or more initial states, and state types are identified, automated data analysis system generates planning problems from the LTS++ specification and entered trace at 440. The automated data analysis system also provides for debugging the model during its creation at 440. The automated data analysis system may then provide testing of the model at 445.

More formally, hypothesis generation via planning includes a dynamical system that is defined as $\Sigma=(F; A; I)$, where F is a finite set of fluent symbols, A is a set of planning actions with preconditions and effects that describes actions that account for the possible transitions of the state of the entity (e.g., patient or host) as well as the discard action that addresses unreliable observations by allowing observations to be unexplained, and I is a clause over F that defines the initial state. The instances of the discard action add transitions to the system that account for leaving an observation unexplained. The added transitions in at least one embodiment ensure that all observations are taken into account but an instance of the discard action for a particular observation o indicates that observation o is not explained. Actions may be over both "good" and "bad" behaviors or transitions. This maps to "good" and "bad" states of the entity, different from a system state (i.e., set of fluents over F). In at least one embodiment, the possible transitions are encoded in LTS++ as described above.

An observation formula $\phi$ is a sequence of fluents in F referred to as a trace. Given the trace $\phi$, and the system description $\Sigma$, a hypothesis $\alpha$ is a sequence of actions in A such that a satisfies $\phi$ in the system $\Sigma$. In at least one embodiment, a notion of plausibility of a hypothesis is defined. Given a set of observations, there are many possible hypotheses, but some could be stated as more plausible than others. For example, since observations are not reliable, the hypothesis $\alpha$ may explain a subset of observations by including instances of the discard action. However, a hypothesis that includes the minimum number of discard actions is more plausible may be indicated. In addition, observations may be ambiguous: they may be explained by instances of "good" actions as well as "bad" actions. Similar to the diagnosis problem, a more plausible hypothesis ideally has the minimum number of "bad" or "faulty" actions. More formally, given a system $\Sigma$ and two hypotheses a and $\alpha'$ as assumption that the system $\Sigma$ may have a reflexive and transitive plausibility relation $\preceq$, where $\alpha \preceq \alpha'$ indicates that a is at least as plausible as $\alpha'$. In an alternative embodiment, the hypotheses generation problem is biased towards favoring "bad" actions over "good" actions. In yet a further alternative embodiment, there is no bias between "good" actions and "bad" actions.

The hypothesis generation problem may then be defined as the following planning problem $P=(F, A', I, \phi)$ where $A'$ is the set A with the addition of positive action costs that accounts for the plausibility relation. A hypothesis is a plan for P and the most plausible hypothesis is the minimum cost plan. That is, if $\alpha$ and $\alpha'$ are two hypotheses, where a is more plausible than $\alpha'$, then cost ($\alpha$)<cost ($\alpha'$). Therefore, the most plausible hypothesis is the minimum cost plan. This planning problem has complete information about the initial state, it is deterministic, it deals with temporally extended goals (i.e., the observations are not over a final state), and actions have costs associated with them. The unreliability of observations in this formulation means in at least one embodiment the generation of multiple highly plausible hypotheses (and not simply the most plausible).

Therefore, returning to FIG. 3, in accordance with the illustrative embodiments, the hypothesis generation problem may be encoded as a planning problem, where the generated plans map to the hypotheses, and furthermore, the top-quality plans map to the plausible hypotheses. Plausible hypotheses are those that the domain expert believes to be more plausible (more likely) compared to the other hypotheses. The notion of plausibility may be encoded as the action costs, where higher the cost indicate the lower the plausibility.

Examples of the set of hypotheses include hypotheses for top quality plans and most (or top) plausible hypotheses. The model of the system would be translated into a planning problem and encoded in a planning domain description language, for example, PDDL (PDDL—Planning Domain Definition Language) or similar, with actions corresponding to explaining observations based on system state and actions that change system state, possibly with additional actions that connect the two types of actions, and possibly some actions that both explain observations and change system state. The planning problem would include the observed transition sequence, with the goal of explaining all observations in the observed sequence by observations generated by the simulated system. This may require additional actions in the planning domain that, in essence, establish the connection between the simulated states and observed observations, and therefore to measure the degree of plausibility of the hypothesis.

Figure 5:
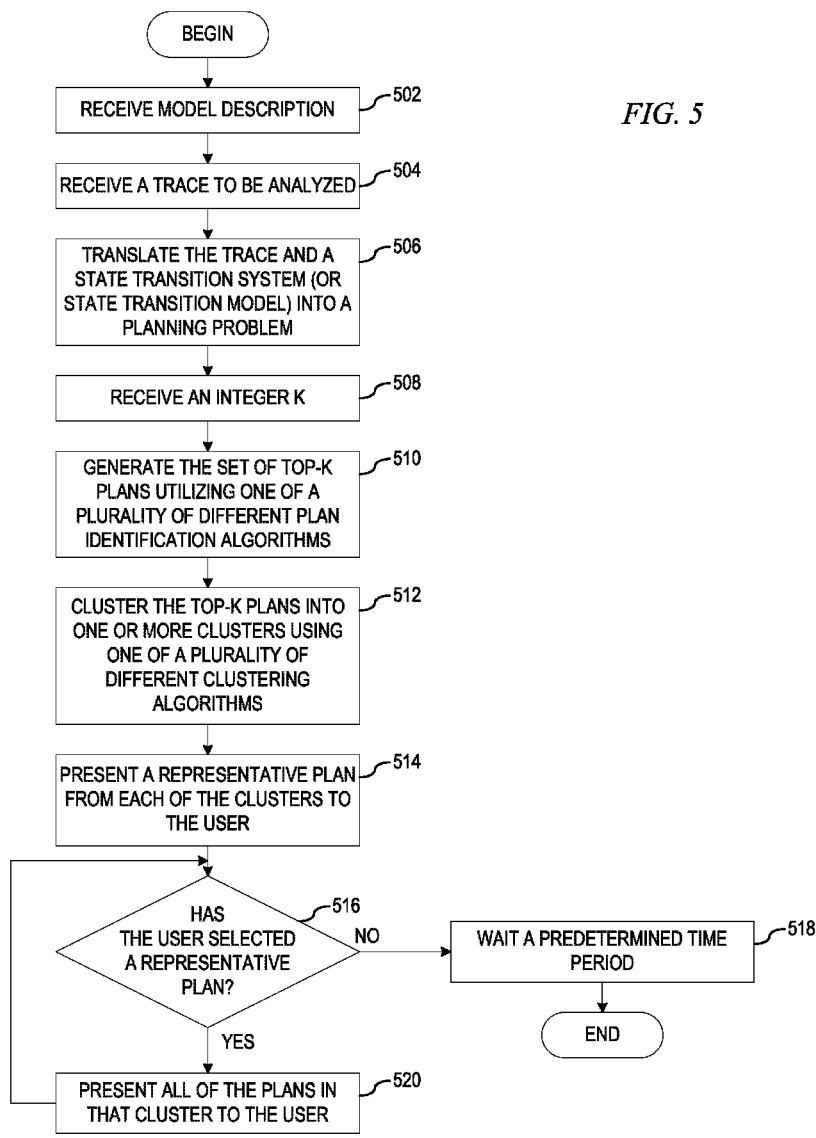
FIG. 5 depicts a flow diagram illustrating the operation performed by plan identification and clustering mechanism in identifying the planning problem from the hypotheses generation problem, in identifying a top subset (k) of a set of high-quality plans and in identifying one or more clusters (m) from the set of top-k plans in accordance with an illustrative embodiment.

In one embodiment, FIG. 5 depicts a flow diagram illustrating the operation performed by plan identification and clustering mechanism in identifying the planning problem from a hypothesis generation problem, in identifying a top subset (k) of a set of high-quality plans, and in identifying one or more clusters (m) from the set of top-k plans in accordance with an illustrative embodiment. As the operation begins, the plan identification and clustering mechanism receives a model description (step 502), using, for example, the described process in FIG. 4, in accordance with an illustrative embodiment. The plan identification and clustering mechanism receives a trace to be analyzed (step 504). Examples of the source include, but are not limited to, a user, surveillance or monitoring software, medical sensors, electronic medical records system, sensors, or the like. The plan identification and clustering mechanism translates the trace and a state transition system (or state transition model) into a planning problem (step 506) as described above. The state transition system is reusable for multiple traces, and as such may be entered into the system independent of the trace and stored, for example, in memory for retrieval by the system. The plan identification and clustering mechanism also receives an integer k from the user that identifies how many top plans are to be identified (step 508). The plan identification and clustering mechanism then generates the set of top-k plans utilizing one of a plurality of different plan identification algorithms (step 510). Once the set of top-k plans are identified, the plan identification and clustering mechanism clusters the top-k plans into one or more clusters using one of a plurality of different clustering algorithms (step 512). The plan identification and clustering mechanism then presents a representative plan from each of the clusters to the user (step 514). The plan identification and clustering mechanism then determines whether the user has selected a representative plan from one of the clusters (step 516). Hat step 516 the user fails to select a representative plan from one of the clusters, then the operation may wait a predetermined time period (step 518) before terminating. If at step 516 the user has selected a representative plan from one of the clusters, then the plan identification and clustering mechanism presents all of the plans in that cluster to the user (step 520), with the operation retuning to step 516 thereafter.

Figure 6:
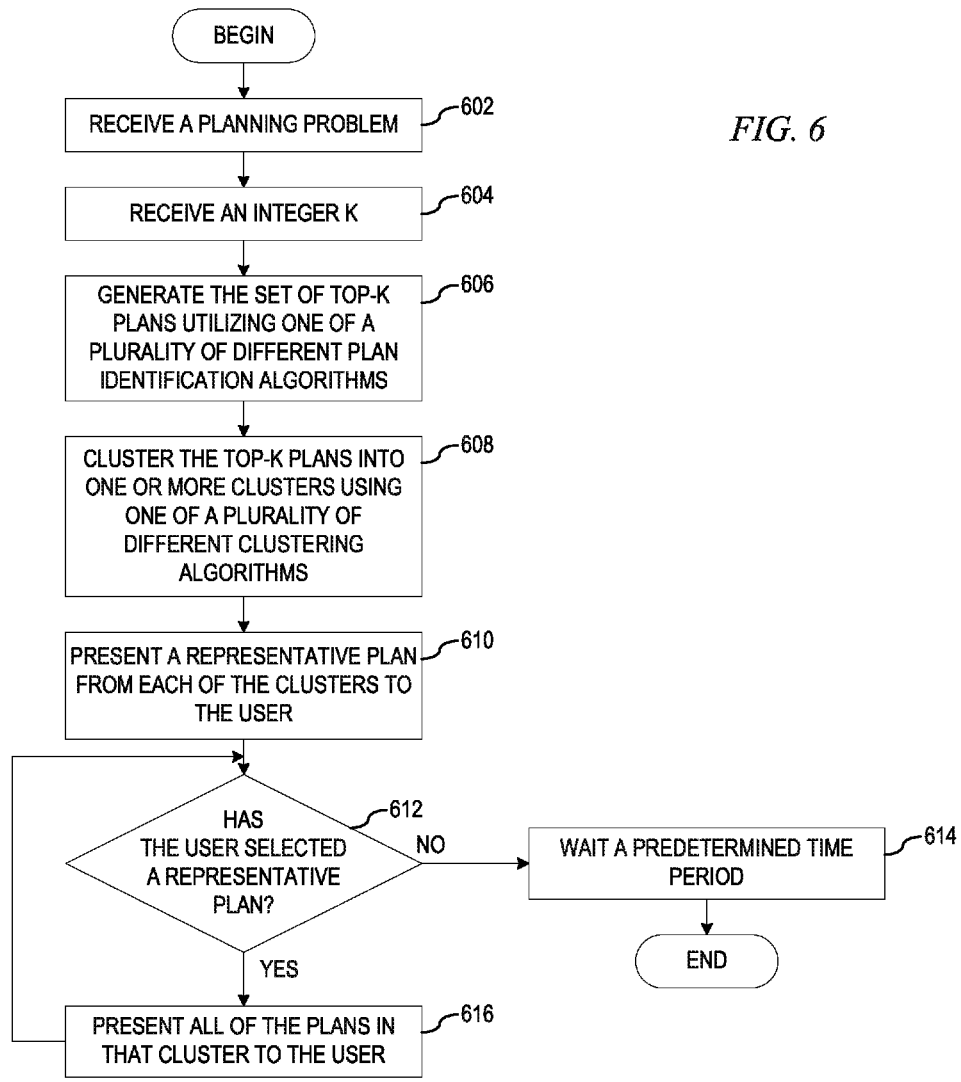
FIG. 6 depicts a flow diagram illustrating the operation performed by plan identification and clustering mechanism in identifying a top subset (k) of a set of high-quality plans and in identifying one or more clusters (m) from the set of top-k plans in accordance with an illustrative embodiment.

In an alternative embodiment, FIG. 6 depicts a flow diagram illustrating the operation performed by plan identification and clustering mechanism in identifying a top subset (k) of a set of high-quality plans and in identifying one or more clusters (in) from the set of top-k plans in accordance with an illustrative embodiment. As the operation begins, the plan identification and clustering mechanism receives a planning problem that includes a finite set of facts, the initial state (a set of facts that are true initially), a finite set of action operators (with precondition and effects), and a goal condition (step 602). The plan identification and clustering mechanism also receives an integer k from the user that identifies how many top plans are to be identified (step 604). The plan identification and clustering mechanism then generates the set of top-k plans utilizing one of a plurality of different plan identification algorithms (step 606). Once the set of top-k plans are identified, the plan identification and clustering mechanism clusters the top-k plans into one or more clusters using one of a plurality of different clustering algorithms (step 608). The plan identification and clustering mechanism then presents a representative plan from each of the clusters to the user (step 610). The plan identification and clustering mechanism then determines whether the user has selected a representative plan from one of the clusters (step 612). If at step 612 the user fails to select a representative plan from one of the clusters, then the operation may wait a predetermined time period step 614) before terminating. If at step 612 the user has selected a representative plan from one of the clusters, then the plan identification and clustering mechanism presents all of the plans in that cluster to the user (step 616), with the operation retuning to step 612 thereafter.

Returning to FIG. 3, in order to identify which of the hypotheses associated with received planning problem in 302 are the top-k plausible hypotheses, top-k identification logic 304 receives the planning problem that includes a finite set of facts, the initial state (a set of facts that are true initially), a finite set of action operators (with precondition and effects), and a goat condition as well as an integer k that identifies the number of top plans to identify (i.e. top-k plans). The integer k may be a fixed integer or may be a function indicating a percentage of an optimal plan the other identified plans must be within.

The top-k planning problem is defined as R=(F; A; I; G; k), where F is a finite set of fluent symbols, A is a set of actions with non-negative costs, I is a clause over F defining the initial state, G is a clause over F defining the goal state, and k is the number of plans to find. Let R'=(F; A; I; G) be the cost optimal planning problem with n valid plans. The set of plans $\pi=\{\alpha_1, \ldots, \alpha_m\}$, where m=k if k≤n, m=n otherwise, is the solution to the top-k planning problem R if an only if each $\alpha_i \in \pi$ is a plan to the cost-optimal planning problem R' and there does not exists a plan $\alpha'$ for R', $\alpha i \notin \pi$ such that cost($\alpha'$)<cost($\alpha_i$) for all $\alpha_i \in \pi$.

Note that if k>n, $\pi$ contains all n valid plans, otherwise $\pi$ contains k plans. $\pi$ can contain both optimal plans and sub-optimal plans, and that for each plan in this set all valid plans of lower cost must be in the set. In addition, at least one optimal plan is in $\pi$ as long as $\pi \neq 0$.

Note, while the goal state, G, is indicated in a form of a final-state goal in the definition of R, temporally extended goals are considered as well. Temporally extended goals such as sequence of observations from a system description either totally ordered or partially ordered may be compiled away to final-state goal following a compilation technique discussed in several papers.

In order to identify the top-k plans, top-k identification logic 304 may utilize one of a plurality of different plan identification algorithms, such as, for example, top-k planning via Eppstien's K shortest paths algorithm or top-k planning via K* search. The particular algorithm utilized is based on whether the algorithm is considered sound, where the algorithm being considered sound is if the algorithm returns valid plans when applied bonny planning problem with nonnegative action costs and n valid plans. The algorithm is considered complete if the algorithm identifies top-k plans when k≤n, or returns all n valid plans otherwise. A plan is not considered valid if the plan includes another plan as its prefix (i.e., a plan that reaches the goal more than once).

A first exemplary embodiment utilizes Eppstien's k shortest paths algorithm to identify the shortest path in state space from an initial state to the goal. Top-k identification logic 304 applies Eppstien's k shortest paths algorithm in state space to solve the top-k planning problem. The application of Eppstien's k shortest paths algorithm is very efficient, but requires the complete graph of states and actions to be available in memory.

K shortest paths problem is an extension of the shortest path problem where in addition of finding one shortest path, a set of paths that represent the k shortest paths is also identified. K shortest path problem is defined as 4-tuple=(G; s; t; k), where G=(V, E) is a graph with a finite set of nodes (or vertices) V and a finite set of m edges E, s is the source node, is the destination node, and k is the number of shortest paths to find. Each edge e∈E has a length (or weight or cost), which we denote by l($\underline{e}$). The length of a path p, l(p), is consequently defined by the sum of the path's edge lengths. The distance d(u,v) for any pair of nodes u and v∈V is the length of the shortest path between the two nodes. Hence, d(s,t) is the length of the shortest path for the problem Q.

Let n=size of the set of all s-t paths in graph G. Then, the set of paths P=$\{p_1, p_2, \ldots, p_m\}$, m=k if k≤n, m=n otherwise, is the solution to the k shortest paths problem if and only if each $p_i \in P$, is a s-t path in graph G and there does not exists a s-t path p' in graph G, p'∉P such that l(p')<l($p_i$) for all $p_i \in P$. That is, if k>n, then P includes all s-t paths, otherwise P contains k shortest paths from node s to node t. It follows that at least one shortest path with length d(s, t) is in the set P if m>0.

Given a k shortest paths problem Q=(G; s; t; k), Eppstein's algorithm first computes a single-destination shortest path tree with t as the destination (or the reversed single-source shortest path tree) by applying Dijkstra's algorithm on G. Dijkstra's algorithm is a well-known shortest path algorithm in Computer Science. The edges in the resulting shortest path tree Tare called the tree edges while all the missing edges (i.e., the edges in G-T) are called the sidetrack edges. Each edge in G is assigned a number that measure the detour cost of taking that edge. Consequently, the detour cost of the tree edges is 0, while the detour cost of the sidetrack edges is greater than 0.

Eppstein's algorithm then uses complex data structure called path graph P(G) that stores the all paths in G, where each node in represents a sidetrack edge. This is followed by the use of the Dijkstra algorithm search to P(G) to extract the k shortest paths. An important property is that given a sequence of sidetrack edges representing a path in P(G) and the shortest path tree T, it is possible to uniquely construct a s-t path in graph G. This may be done by using sub-paths from T to connect the endpoints of sidetrack edges. Given this property and the special structure of P(G), it is ensured that the i-th shortest path in P(G) results in a sidetrack sequence which can be mapped to the i-th shortest path in G.

Thus, in order to identify the top-k plans using Eppstien's k shortest paths algorithm, top-k identification logic 304 reads the planning problem, where planning problem R=(F; A; I; G; k). Top-k identification logic 304 applies forward grounding to A to create operator set O. Top-k identification logic 304 initializes graph G=(V, E) and lets V={I}g and E+∅. Top-k identification logic 304 let U={I}. For each state s∈U, top-k identification logic 304 sets U=U-{s}. For each operator o∈O such that s satisfies precondition of o, top-k identification logic 304 let s'=o(s). If edge o(s, s')∉E, then top-k identification logic 304 determines whether s'∉V. If s'∉V, then top-k identification logic 304 lets V=V∪{s'} and U=U∪{s'}. Top-k identification logic 304 adds o(s, s') to E and lets cost(o(s, s'))=cost(o). If U #∅, then operation returns to apply the next state s∈U. If U=∅, then top-k identification logic 304 applies Eppstien's k shortest paths algorithm to graph G to find k shortest paths.

Therefore, top-k planning using Eppstien's k shortest paths algorithm includes three main stages. The first stage implements action grounding, the second stage implements forward search to construct the complete state transition graph G, and the third stage applies Eppstien's k shortest paths algorithm to the resulting graph G. Since nodes in graph G represent states and edges in graph G correspond to operators, all paths in graph G correspond to plans in planning problem R, and paths have the same cost as corresponding plans. Therefore, the solution produced by Eppstien's k shortest paths algorithm directly maps to a solution to the top-k planning problem. Furthermore, soundness and completeness of Eppstien's k shortest paths algorithm follows directly from the soundness and completeness of the Eppstien's k shortest paths algorithm.

Figure 7A:
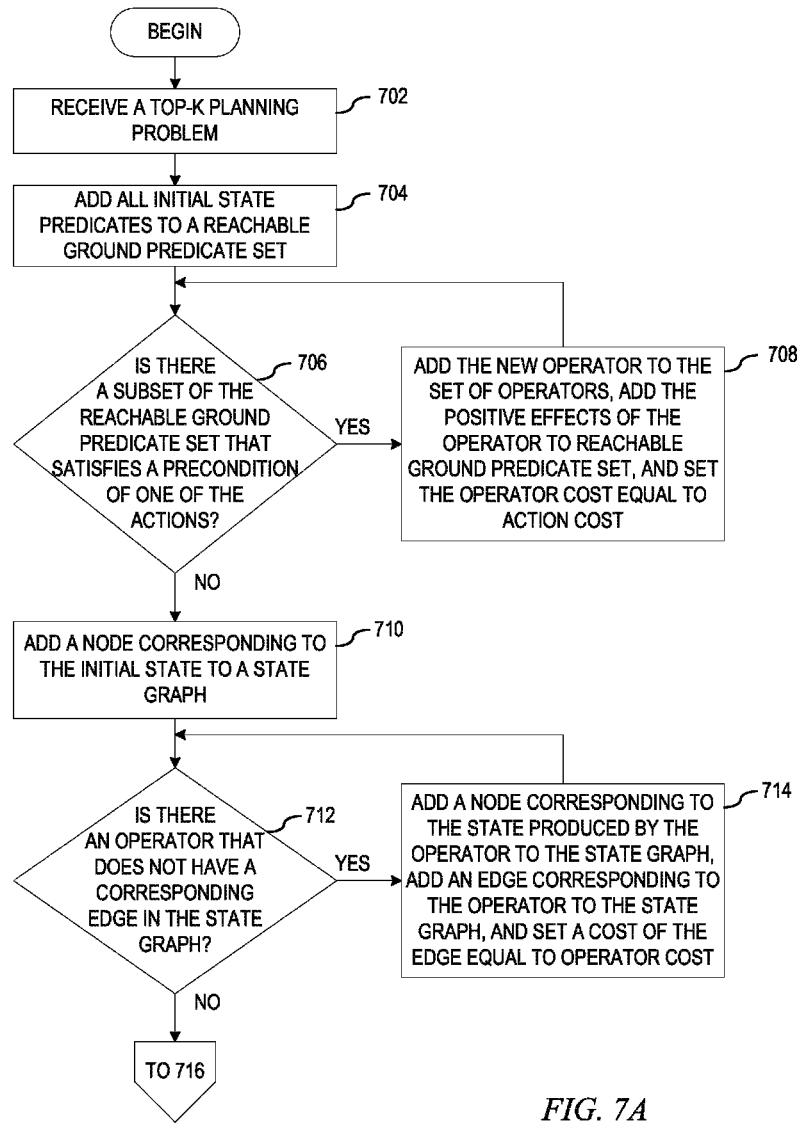
FIGS. 7A and 7B depict a flow diagram illustrating the operation performed using Eppstien's k shortest paths algorithm to identify a top subset (k) of a set of high-quality plans in accordance with an illustrative embodiment.
Figure 7B:
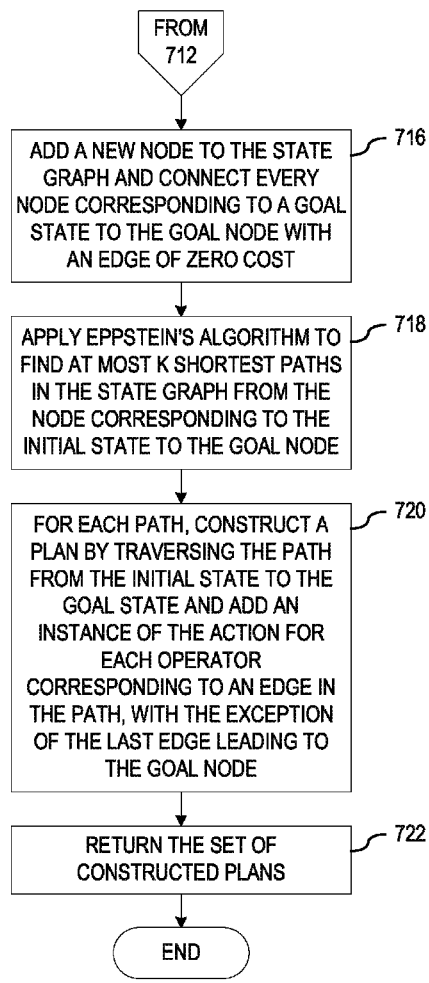

FIGS. 7A and 7B depict a flow diagram illustrating the operation performed using Eppstien's k shortest paths algorithm to identify a top subset (k) of a set of high-quality plans in accordance with an illustrative embodiment. As the operation begins, top-k identification logic receives a top-k planning problem, such as received planning problem 302 (step 702). The top-k identification logic adds all initial state predicates to a reachable ground predicate set (step 704). The top-k identification logic attempts to find a subset of the reachable ground predicate set that satisfies the precondition of one of the actions, such that the resulting grounding of the action is a new operator, not yet included in the set of operators (step 706). If at step 706 the top-k identification logic finds a subset of the reachable ground predicate set that satisfies the precondition of one of the actions, the top-k identification logic adds the new operator to the set of operators, adds the positive effects of the operator to reachable ground predicate set, and sets the operator cost equal to action cost (step 708), with the operation returning to step 706 thereafter. If at step 706 the top-k identification logic fails to find a subset of the reachable ground predicate set that satisfies the precondition of one of the actions, the top-k identification logic adds a node corresponding to the initial state to a state graph (step 710).

The top-k identification logic then finds an operator that, when applied to one of the states corresponding to nodes in the state graph, does not have a corresponding edge in the state graph (step 712). If at step 712 the top-k identification logic finds an operator that does not have a corresponding edge in the state graph, the top-k identification logic adds a node corresponding to the state produced by the operator to the state graph, adds an edge corresponding to the operator to the state graph, and sets a cost of the edge equal to operator cost (step 714), with the operation returning to step 712 thereafter. If at step 712 the top-k identification logic fails to finds an operator that does not have a corresponding edge in the state graph, the top-k identification logic adds a new node to the state graph, which is referred to as a goal node, and connects every node corresponding to a goal state to the goal node with an edge of zero cost (step 716).

The top-k identification logic then applies Eppstein's algorithm to find at most k shortest paths in the state graph from the node corresponding to the initial state to the goal node (step 718). For each path, the top-k identification logic constructs a plan by traversing the path from the initial state to the goal state and adds an instance of the action for each operator corresponding to an edge in the path, with the exception of the last edge leading to the goal node (step 720). The top-k identification logic then returns the set of constructed plans (step 722), with the operation ending thereafter.

Returning to FIG. 3, a second exemplary embodiment utilizes a K* algorithm proposed by Aljazzar and Leue that allows construction of a graph G dynamically using heuristic-guided A* search, while updating an equivalent of P(G) to find k shortest paths. A* search algorithm is a well-known search algorithm in Computer Science. In addition to eliminating the complete state graph construction, top-k identification logic 304 grounds actions dynamically using the K* algorithm thereby eliminating the expensive grounding stage.

The K* algorithm uses many of the same concepts as in the Eppstien's k shortest paths including sidetrack edges, detour costs, and the path graph P(G) (although with a few differences in the K* algorithm construction) and has the same worst-case complexity as the Eppstien's k shortest paths. However, the K* algorithm has better performance in practice because, unlike the Eppstien's k shortest paths, the K* algorithm does not require the graph G to be completely defined or available when the search starts. The K* algorithm also does not perform the all-nodes shortest path computation on graph G to compute the shortest path tree T. In short, top-k identification logic 304 utilizes the K* algorithm as follows.

Initially, top-k identification logic 304 apply a forward A* search to construct a portion of graph G. Top-k identification logic 304 then suspends A* search, updates the path graph P(G) to include nodes and sidetracks discovered by the A* search, and applies the Dijkstra algorithm to the path graph P(G) to extract solution paths. Top-k identification logic 304 then resumes the A* search to dynamically expand graph G in order to enable the use of heuristic search and also allows extraction of the solution paths before graph G is fully explored.

Therefore, in order to identify the top-k plans using the K* shortest paths algorithm, top-k identification logic 304 reads the received planning problem 302 where planning problem R=(F; A; I; G; k). Top-k identification logic 304 expand the state of graph G by using the A* search and applying actions to compatible states starting from I, and until graph G is reached. Top-k identification logic 304 continues to apply the A* search to expand graph G until a predetermined increase in links or nodes is reached. Top-k identification logic 304 updates path graph P(G) based on new links in graph G. Top-k identification logic 304 then applies the Dijkstra algorithm to extract the next path from path graph P(G). If k paths are found, top-k identification logic 304 exits the K* algorithm. If k paths are found, the top-k identification logic 304 determines whether a K* scheduling condition is reached. If the top-k identification logic 304 identifies that the K* scheduling condition is reached, then the operation returns to expand the state of graph G further by using the A* search. If the top-k identification logic 304 identifies that the K* scheduling condition fails to be reached, then the operation returns to apply the Dijkstra algorithm to extract the next path from path graph P(G).

The K* scheduling condition is evaluated by comparing the state of A* and Dijkstra searches, as defined in K* algorithm. The K* scheduling condition determines whether new links must be added to graph G before resuming Dijkstra search on updated path graph P(G). There is no separate grounding stage, since actions are ground at the same time when they are applied during A* search.

Figure 8A:
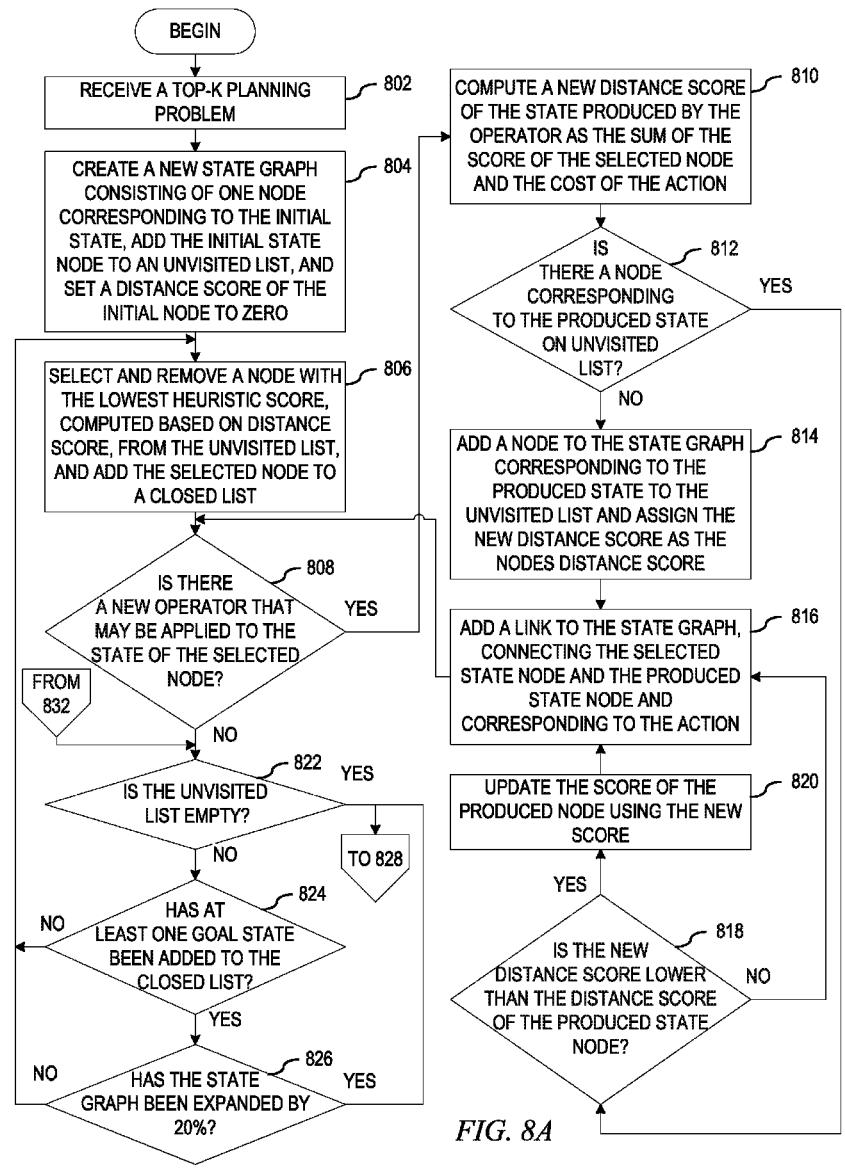
FIGS. 8A and 8B depict a flow diagram illustrating the operation performed using K* algorithm to identify a top subset (k) of a set of high-quality plans in accordance with an illustrative embodiment.
Figure 8B:
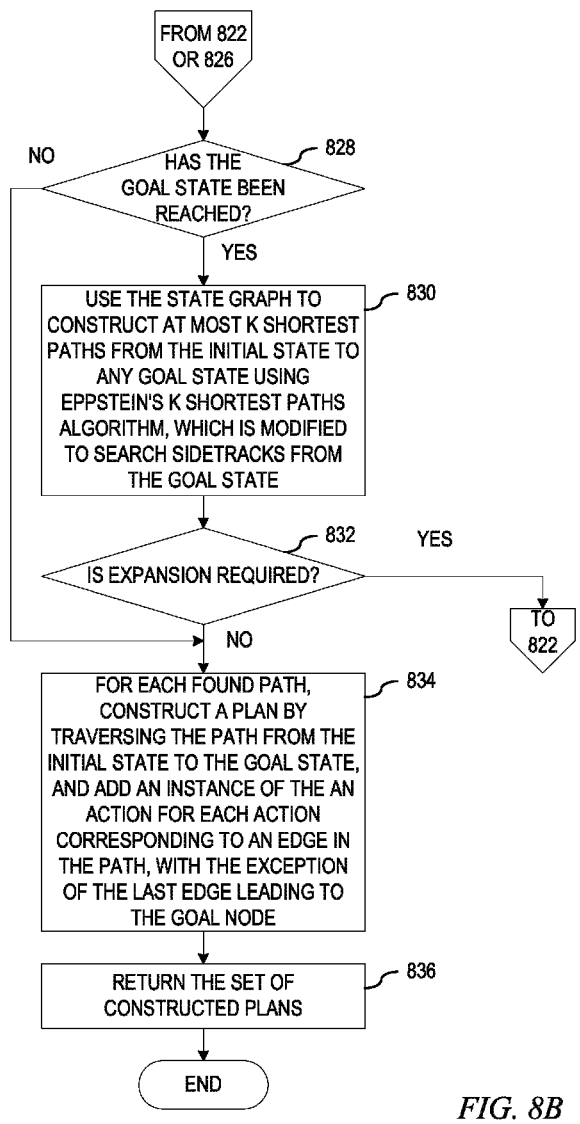

FIGS. 8A and 8B depict a flow diagram illustrating the operation performed using K* algorithm to identify a top subset (k) of a set of high-quality plans in accordance with an illustrative embodiment. As the operation begins, the top-k identification logic receives a top-k planning problem (step 802). The top-k identification logic creates a new state graph consisting of one node corresponding to the initial state, adds the initial state node to an unvisited list, and sets a distance score of the initial node to zero (step 804). The top-k identification logic then selects and removes a node with the lowest heuristic score, computed based on distance score, from the unvisited list, and adds the selected node to a closed list (step 806). The top-k identification logic then attempts to find a new operator that may be applied to the state of the selected node, such that the state produced by the action when applied to the selected node state is not in the closed list (step 808).

If at step 808 the top-k identification logic finds a new operator that may be applied to the state of the selected node, the top-k identification logic computes a new distance score of the state produced by the operator as the sum of the score of the selected node and the cost of the action (step 810). The top-k identification logic then determines whether there is a node corresponding to the produced state on unvisited list (step 812). If at step 812 the top-k identification logic determines that there is not a node corresponding to the produced state on unvisited list, the top-k identification logic adds a node to the state graph corresponding to the produced state to the unvisited list and assigns the new distance score as the nodes distance score (step 814). The top-k identification logic then adds a link to the state graph, connecting the selected state node and the produced state node and corresponding to the action (step 816), with the operation returning to step 808. If at step 812 the top-k identification logic determines that there is a node corresponding to the produced state on unvisited list, the top-k identification logic determines whether the new distance score is lower than the distance score of the produced state node (step 818). If at step 818 the top-k identification logic determines that the new distance score is lower than the distance score of the produced state node, the top-k identification logic updates the score of the produced node using the new score (step 820), with the operation proceeding to step 816 thereafter. If at step 818 the top-k identification logic determines that the new distance score fails to be lower than the distance score of the produced state node, the operation proceeds to step 816.

If at step 808 the top-k identification logic fails to find a new operator that may be applied to the state of the selected node, the top-k identification logic determines whether the unvisited list is empty (step 822). If at step 822 the unvisited list is not empty, the top-k identification logic determines whether at least one goal state has been added to the closed list (step 824). If at step 824 the top-k identification logic determines that no goal state has been added to the closed list, then the operation returns to step 806. If at step 824 the top-k identification logic determines that at least one goal state has been added to the closed list, then the top-k identification logic determines whether the state graph been expanded by at least 20 percent in the number of links since the goal state has been added to closed list or after step 830, which is discussed below (step 826). If at step 826 the top-k identification logic determines that the state graph has not been expanded by at least 20 percent, the operation returns to step 806.

If at step 826 the top-k identification logic determines that the state graph has been expanded by at least 20 percent or if at step 822 the unvisited list is empty, the top-k identification logic determines whether the goal state has been reached (step 828). If at step 828 the top-k identification logic determines that the goal state has been reached, the top-k identification logic uses the state graph to construct at most k shortest paths from the initial state to any goal state using Eppstein's k shortest paths algorithm, which is modified to search sidetracks from the goal state (step 830). Eppstein's algorithm is stopped when k paths are found or when the comparison of the unvisited list of the Eppstein's k shortest paths algorithm with distance score of at least one of the nodes of the unvisited list indicates further expansion of the state graph is required. Thus, the top-k identification logic determines whether expansion is required (step 832). If at step 832 the top-k identification logic determines that expansion is required, the operation returns to step 822.

If at step 832 the top-k identification logic determines that expansion is not required or if at step 828 the top-k identification logic determines that the goal state has not been reached, for each found path, the top-k identification logic constructs a plan by traversing the path from the initial state to the goal state, and adds an instance of the action for each action corresponding to an edge in the path, with the exception of the last edge leading to the goal node (step 834). The top-k identification logic then returns the set of constructed plans (step 836), with the operation ending thereafter.

Thus, returning to FIG. 3, the illustrative embodiment may use any one of a plurality of algorithms to identify a set of top-k plans, such as, for example, top-k planning via Eppstien's k shortest paths or top-k planning via K* search. Once top-k identification logic 304 has identified a set of top-k plans, plan identification and clustering mechanism 300 utilizes clustering logic 306 to cluster the identified top-k plans. That is, many of the generated top-k plans are only slightly different from each other, such that one top-k plan may be different from another top-k plan by only one or more states that are different. This is because top-k identification logic 304 generates all alternative plans or all possible state transitions, and while this generates distinct plans, not all of the plans are significantly different from each other. Furthermore, the differentiating states in any two plans that are slightly different from each other may be hierarchically related to one another. Thus, clustering logic 306 clusters plans in order to better present the space of the top-k plans. That is, instead of presenting large number of plans, some of which could be very similar to each other, clustering logic 306 clusters top-k plans into a set of groups or clusters so that top-m clusters of plans may be presented, where each cluster may be represented by a representative plan.

In the illustrative embodiments, clustering logic 306 clusters the plans in the top-k plans without specifying any input parameters, such as the number of clusters. This is because no prior knowledge on the number of clusters or the size of the cluster is available. Depending on the domain, there may be cases where many plans may be put into a single cluster due to high similarity. Likewise, there are also cases that the plans are all different, and the output must contain m clusters of size 1. Hence, given a set of k sorted plans, S, clustering logic 306 creates clusters of plans C= $\{c_1 \ldots, c_o\}$ where the value o is unknown ahead of time. Then plan identification and clustering mechanism 300 presents only m of these clusters to the user or to the automated system for further investigation. Note that our focus is on partitioning the plans in such a way that there is no overlap among the clusters. That is, for each two clusters $c_i, c_j \in C$, $c_i \cap c_j = \emptyset$ and $\forall h_i \in S$, $\exists c_i \in C$ such that $h_i \in c_i$. That is, each cluster is disjoint and all plans belonging to a cluster. Using these statements, clustering logic 306 separates similarity measures from a utilized clustering algorithm. However, clustering logic 306 does not produce a set of similar pairs, instead clustering logic 306 utilizes a similarity measure function invoked by the clustering algorithm every time clustering logic 306 compares two plans. Similarity measure functions takes, as input, the set of elements (plans or hypotheses) and decides if the two are similar. Two elements are said to be similar if their similarity score is above a specific threshold $\theta$.

Using the similarity measure function, clustering logic 306 compares the plans in the top-k plans as a comparison of a sequence of strings, but considering only the state transition sequence of each plan. In at least one embodiment, clustering logic 306 views each state of a plan as a "token" (i.e. state) in a string, and the sequence of states as the string (which is a sequence of tokens). Thus, using the sequence of states, clustering logic 306 is able to determine a relationship between states (parent/child relationships of state in the hierarchy) to determine if two plans belong to a same cluster.

Clustering logic 306 utilizes two strings $r_1$ and $r_2$ associated with two plans $p_1$ and $p_2$, respectively, and computes a similarity score as a minimum transformation cost required to convert string $r_1$ to $r_2$. Clustering logic 306 first tokenizes strings $r_1$ and $r_2$ with each token assigned a weight w(t). The illustrative embodiments use predetermined weights for each type of state transition. When converting string $r_1$ to $r_2$, there are three kinds of transformations: insertion, deletion, and replacement. The token insertion cost is $w(t) \cdot c_{ins}$ where t is the inserted token in string $r_1$ and $c_{ins}$ is an insertion factor of a first predetermined value. Token deletion has a cost of w(t), where t is the deleted token from string $r_1$. The token replacement cost is $(1-similarity(t_1, t_2)) \cdot w(t)$. Clustering logic 306 uses state relationships to determine the similarity between $t_1$ and $t_2$. That is, if one state is a child or a parent of another state (or if the two states share a same parent), a similarity score is set to a higher number (for example, 0.5), otherwise the similarity score is set to either 0 (if the states are unrelated) or 1 (if the states are the same). The similarity score between $r_1$ and $r_2$ is given by $1-\min(mct(r_1, r_2)/wt(r_1), 1.0)$ where $mct(r_1, r_2)$ is the minimum cost of the transformation between the two strings, and $wt(r_1)$ is the total weight of the string $r_1$. Note that the similarity score calculation normalizes the similarity score which is a number between 0 and 1, where a 0 means strings $r_1$ and $r_2$ are non-similar and a 1 means strings $r_1$ and $r_2$ are the same. The threshold is also a number between 0 and 1. This normalization is helpful since normalization allows choosing a similarity threshold independently of the size of the hypotheses.

Once the similarity of each of the plans has been identified, clustering logic 306 clusters the plans using one of a plurality of different clustering algorithms, such as, for example, a center-link clustering algorithm, a single-link clustering algorithm, or an average-link clustering algorithm. Each of these algorithms may be referred to as single-pass algorithm. A single-pass algorithm visits each of the top-k plans only once (single scan).

Utilizing the center-link clustering algorithm, clustering logic 306 iterates over the top-k plans starting with highest-quality plan, or in at least one embodiment, the least cost plan. For each plan, clustering logic 306 determines a similarity to a representative of each cluster created in previous iterations. If there are no clusters that have a representative plan similar to the current plan (i.e., have similarity below $\theta$), a new cluster is created and the plan becomes that cluster's representative plan. Otherwise, the current plan is added to a cluster where the representative plan is found to be similar to the current plan. Cluster representatives are chosen to be, in at least one embodiment, the minimum cost plan in the cluster. Due to the order of iteration, the cluster representative plan is always the first plan added to the cluster. Utilization of the center-link clustering algorithm may result in small number of similarity comparisons compared to other algorithms, because each plan is only compared to the representative plan.

Figure 9:
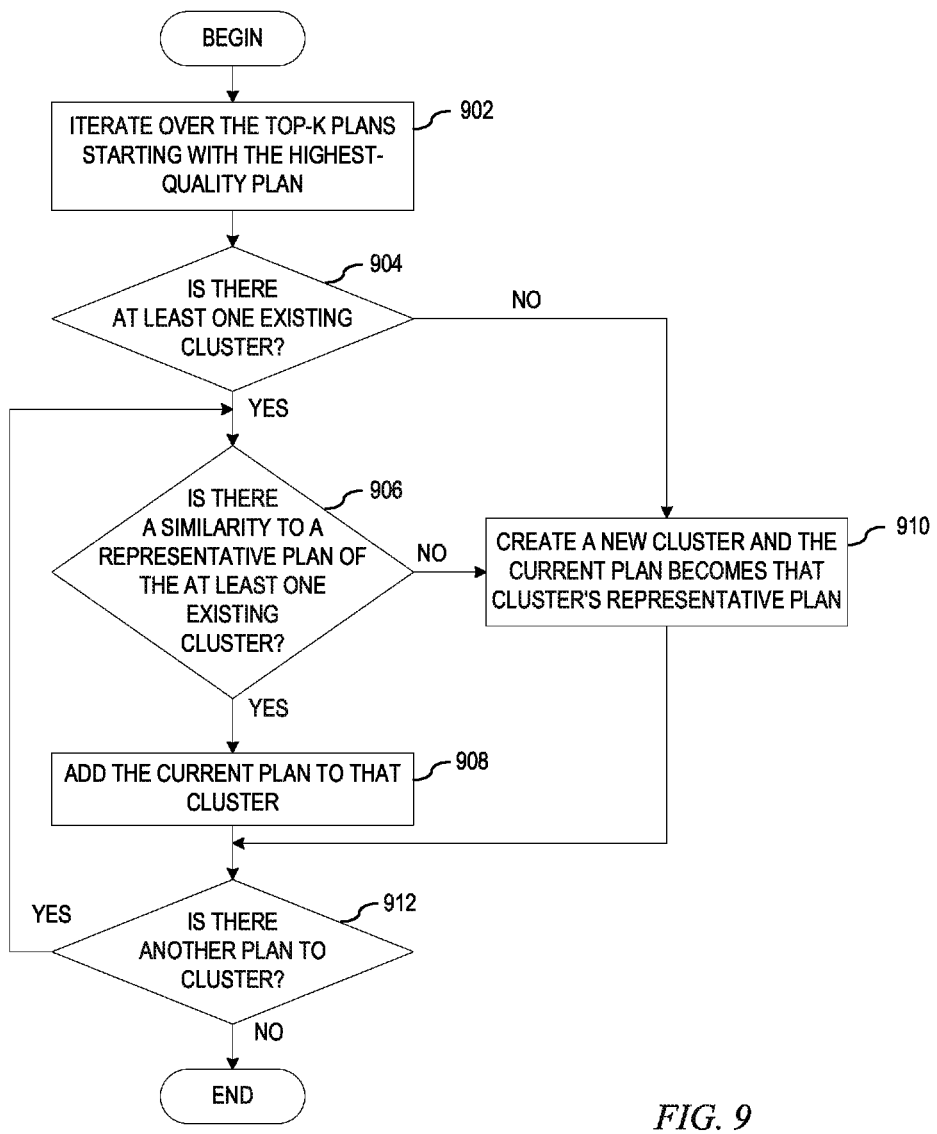
FIG. 9 depicts a flow diagram illustrating the operation performed clustering as a set of top-k plans using a center-link algorithm in accordance with an illustrative embodiment.

FIG. 9 depicts a flow diagram illustrating the operation performed clustering as a set of top-k plans using a center-link algorithm in accordance with an illustrative embodiment. As the operation begins, the plan identification and clustering mechanism iterates over the top-k plans starting with the highest-quality plan (step 902). In at least one embodiment, high-quality plans means low-cost plan. The plan identification and clustering mechanism determines whether there is at least one existing cluster (step 904). If at step 904 there is at least one existing cluster, then plan identification and clustering mechanism determines a similarity to a representative plan of the at least one existing cluster (step 906). If at step 906 there is representative plans in the at least one cluster that is similar to the current plan, then the plan identification and clustering mechanism adds the current plan to that cluster (step 908).

If at step 906 no representative plans in the at least one cluster are similar to the current plan, the plan identification and clustering mechanism creates a new cluster and the current plan becomes that cluster's representative plan (step 910). From step 908 or from step 910, the plan identification and clustering mechanism then determines whether there is another plan to cluster (step 912). If at step 912 there is another plan to cluster, then the operation returns to step 906. If at step 912 there is not another plan to cluster, the operation terminates. Returning to step 904, if at step 904 there is not at least one existing cluster, then the operation proceeds to step 910.

Returning to FIG. 3, utilizing the single-link clustering algorithm, which is an extension of the center-link clustering algorithm, instead of comparing only with the representative plan of a cluster to the current plan, clustering logic 306 compares the current plan with all plans in the cluster. If clustering logic 306 determines that the current to be similar to any of the plans of that cluster, then the current plan is assigned to that cluster. The single-link clustering algorithm may result in the smallest number of clusters, because the plans of a cluster may have the largest distance between each other.

Figure 10:
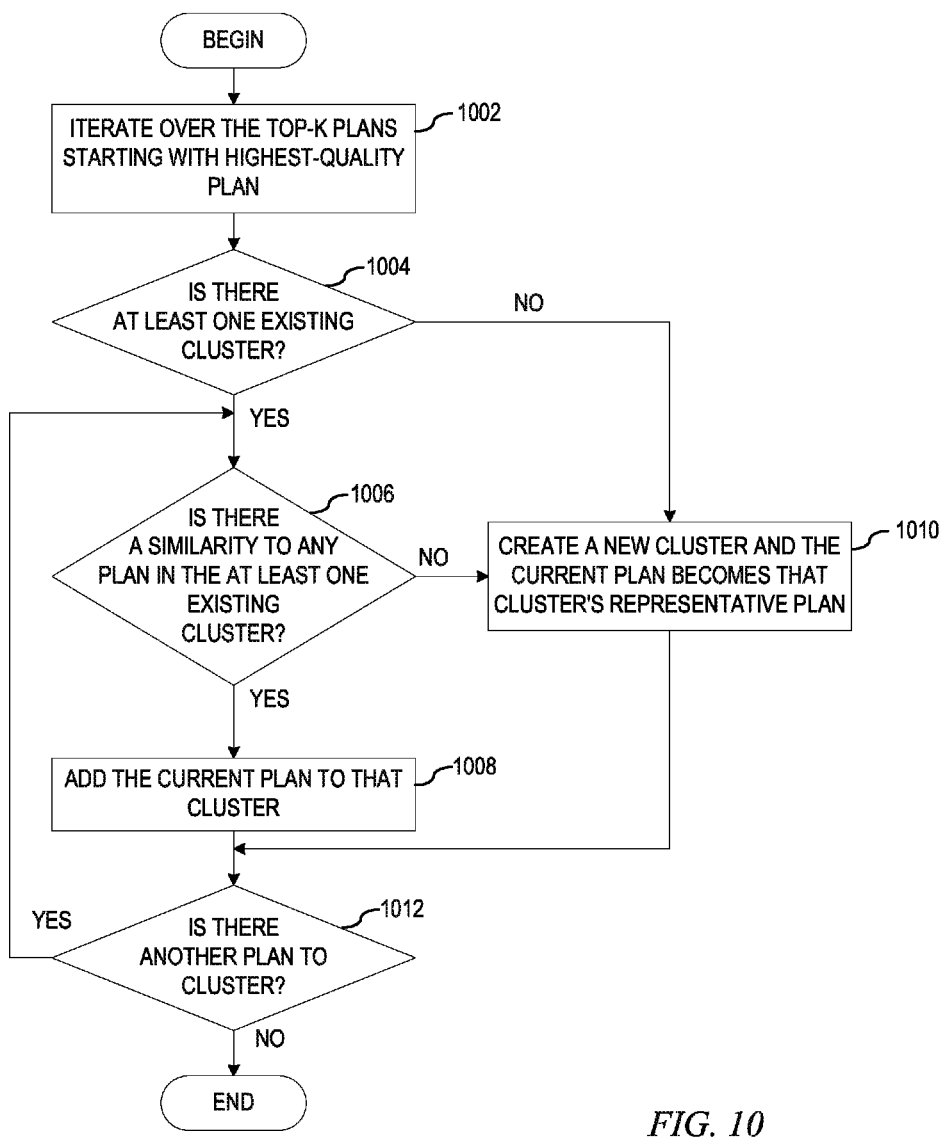
FIG. 10 depicts a flow diagram illustrating the operation performed clustering as a set of top-k plans using a single-link algorithm in accordance with an illustrative embodiment.

FIG. 10 depicts a flow diagram illustrating the operation performed clustering as a set of top-k plans using a single-link algorithm in accordance with an illustrative embodiment. As the operation begins, the plan identification and clustering mechanism iterates over the top-k plans starting with the highest-quality plan or, in at least one embodiment, the least cost plan (step 1002). The plan identification and clustering mechanism determines whether there is at least one existing cluster (step 1004). If at step 1004 there is at least one existing cluster, then plan identification and clustering mechanism determines a similarity to each plan in the at least one existing cluster (step 1006). If at step 1006 there is a plan in the at least one cluster that is similar to the current plan, then the plan identification and clustering mechanism adds the current plan to that cluster (step 1008).

If at step 1006 no plan in the at least one cluster is similar to the current plan, the plan identification and clustering mechanism creates a new cluster and the current plan becomes that cluster's representative plan (step 1010). From step 1008 or from step 1010, the plan identification and clustering mechanism then determines whether there is another plan to cluster (step 1012). If at step 1012 there is another plan to cluster, then the operation returns to step 1006. If at step 1012 there is not another plan to cluster, the operation terminates. Returning to step 1004, if at step 1004 there is not at least one existing cluster, then the operation proceeds to step 1010.

Returning to FIG. 3, utilizing the average-link clustering algorithm, which is a simple extension of the single-link clustering algorithm, clustering logic 306 compares a current plan with all the plans of a cluster and utilizes the average similarity score to determine whether the plan belongs to that cluster or not. The average-link clustering algorithm results in many similarity comparisons and may result in a large number of clusters.

Figure 11:
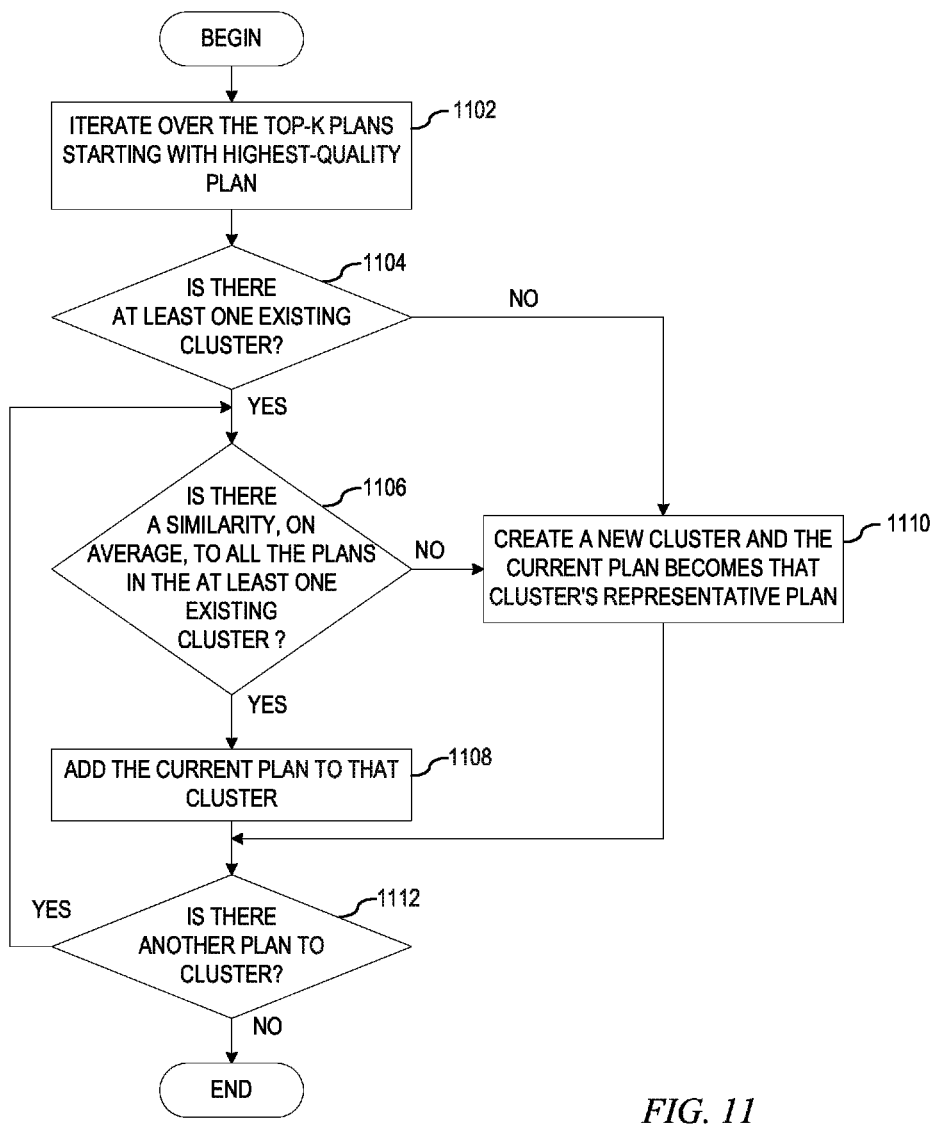
FIG. 11 depicts a flow diagram illustrating the operation performed clustering as a set of top-k plans using an average-link algorithm in accordance with an illustrative embodiment.

FIG. 11 depicts a flow diagram illustrating the operation performed clustering as a set of top-k plans using an average-link algorithm in accordance with an illustrative embodiment. As the operation begins, the plan identification and clustering mechanism iterates over the top-k plans starting with the highest-quality plan or, in at least one embodiment, least cost plan (step 1102). The plan identification and clustering mechanism determines whether there is at least one existing cluster (step 1104). If at step 1104 there is at least one existing cluster, then plan identification and clustering mechanism determines a similarity, on average, to all the plans in the at least one existing cluster (step 1106). If at step 1106 there is a similarity, on average, to the plans in the at least one cluster, then the plan identification and clustering mechanism adds the current plan to that cluster (step 1108).

If at step 1106 no plan in the at least one cluster is similar, on average, to the current plan above the similarity score threshold, the plan identification and clustering mechanism creates a new cluster and the current plan becomes that cluster's representative plan (step 1110). From step 1108 or from step 1110, the plan identification and clustering mechanism then determines whether there is another plan to cluster (step 1112). If at step 1112 there is another plan to cluster, then the operation returns to step 1106. If at step 1112 there is not another plan to cluster, the operation terminates.

Returning to step 1104, if at step 1104 there is not at least one existing cluster, then the operation proceeds to step 1110.

Returning to FIG. 3, in at least one embodiment with respect to the hypotheses generation problem, determining which clustering algorithm to use may be based on historical information regarding the clustering algorithm's ability to cluster plans such that plans in the cluster have an approximately equal number of state transitions, whether the plans in a cluster are hierarchically related, and/or whether the final states of each cluster are either the same or hierarchically related. The first criterion as to plans in the cluster having an approximately equal number of state transitions ensures that the plans in each cluster do not differ in size. The second criterion as to whether the plans or the hypotheses in a cluster are hierarchically related ensures that while the plans of the same clusters are different, they are different with respect to hierarchically related states. The third criterion as to whether the final states of each hypothesis in the cluster are either the same or hierarchically related is important for an action selection component that uses the final state of a hypothesis to select analytic actions.

Other evaluation techniques besides the one mentioned above for the hypothesis generation application may be used to evaluate the clusters in a more general sense. In particular, the distance may be measured between the plans in both within the clusters and across the clusters. One way to evaluate this is to compare the representative plans with each other following a set of known techniques. In particular, the diversity distance may be computed between each cluster to determine the distance between the clusters. The diversity distance between two plans may be computed by average of number of actions/states that are in one plan and not in another.

Once clustering logic 306 has clustered all plans in the top-k plans identified by top-k identification logic 304, plan identification and clustering mechanism 300 utilizes presentation logic 308 to present the representative plan from each of the clusters to the user. In presenting the representative plan from each of the clusters to the user, if the user selects a particular plan that as additional plans in the cluster, presentation logic 308 presents the other plans in the cluster to the user for the users review.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for identifying a set of top-k plans based on the quality of each plan in a set of plans and, amongst the identified set of top-k plans, identifying one or more clusters, i.e. top-m clusters, from the set of top-k plans. In particular, the illustrative embodiments identify a set of k distinct plans with a lowest cost, where the k distinction plan includes both optimal plans and near-optimal plans, depending on k, and, by definition, for each plan in this set all valid plans of lower cost must also be in the set. The top-k plans are then ranked based on each plans associated quality, i.e. the cost associated with the plan, where the lowest cost identifies the highest quality. The top-k plans are then grouped using clustering techniques into top-m clusters, with a representative set of each cluster being presented with an option of viewing all plans within that cluster.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having a computer readable program stored therein, wherein the computer readable program, when executed on a computing device, causes the computing device to:
   receive a planning problem for testing and treatment of a patient in a hospital and an integer value k indicating a number of top plans to be identified for the planning problem;
   generate a set of top-k plans with at most size k, wherein the set of top-k plans is with respect to a given measure of plan quality, wherein the plan quality is measured by a cost of a plan, wherein each action in the plan is associated with an action cost encompassed in the cost of the plan, and wherein generating the set of top-k plans with at most k is performed by applying Eppstein's shortest paths algorithm to find k shortest paths in a state graph from a node corresponding to an initial state to a goal node;
   cluster each plan in the set of top-k plans based on a similarity between plans such that each cluster contains similar plans and each plan is grouped only into one cluster thereby forming the set of top-m clusters; and
   present a representative plan from each top-rn cluster to the user, wherein the representative plan is a minimum cost plan in the top-m cluster.

2. The computer program product of claim 1, wherein the integer value k is at least one of a fixed integer or a function indicating a percentage of an optimal plan other identified plans must be within.

3. The computer program product of claim 1, wherein the computer readable program generates the top-k plans by causing the computing device to:
   responsive to receiving a planning problem, add all initial state predicates to a reachable ground predicate set;
   responsive to finding a subset of the reachable ground predicate set that satisfies the precondition of one of the actions, add a new operator to a set of operators, add positive effects of the new operator to the reachable ground predicate set, and set an operator cost equal to action cost;
   responsive to a failure to find a subset of the reachable ground predicate set that satisfies the precondition of one of the actions, add the node corresponding to the initial state to the state graph;
   responsive to finding an operator that does not have a corresponding edge in the state graph, add a node corresponding to the state produced by the operator to the state graph, add an edge corresponding to the operator to the state graph, and set a cost of the edge equal to the operator cost;
   responsive to a failure to find an operator that does not have a corresponding edge in the state graph, add a new node to the state graph thereby forming the goal node, and connect every node corresponding to a goal state to the goal node with an edge of zero cost; and
   construct the set of top-k plans by traversing each path from the initial state to the goal state and adding an instance of the action for each operator corresponding to an edge in the path.

4. The computer program product of claim 1, wherein the computer readable program generates the top-k plans by causing the computing device to:
   responsive to receiving a top-k planning problem, create a new state graph consisting of one node corresponding to the initial state, add the initial state node to an unvisited list, and set a distance score of the initial node to zero;
   select and remove a node with a lowest heuristic score, computed based on distance score, from the unvisited list, and add the selected node to a closed list;
   responsive to finding a new operator that may be applied to the state of the selected node:
      compute a new distance score of the state produced by the operator as the sum of the score of the selected node and the cost of the action;
      responsive to determining that there is not a node corresponding to the produced state on unvisited list, add a node to the new state graph corresponding to the produced state to the unvisited list, assign the new distance score as the nodes distance score, and add a link to the new state graph that connects the selected state node and the produced state node corresponding to the action; and
      responsive to determining that there is a node corresponding to the produced state on unvisited list, update the score of the produced node using the new score and add a link to the new state graph that connects the selected state node and the produced state node corresponding to the action;
   responsive to the unvisited list being empty and responsive to the goal state being reached, or responsive to the unvisited list failing to be empty, the new state graph being expanded by preset percentage, and responsive to the goal state being reached, use the new state graph to construct the k shortest paths from the initial state to any goal state using Eppstein's k shortest paths algorithm;
   responsive to a failure to identify k shortest paths, repeat the process until k-shortest paths are identified; and responsive to k shortest paths being found, for each found path, construct a plan by traversing the path from the initial state to the goal state, and add an instance of the action for each action corresponding to an edge in the path.

5. The computer program product of claim 1, wherein the computer readable program clusters each plan of the set of top-k plans by causing the computing device to:
 iterate over the top-k plans starting with a highest-quality plan;
 responsive to the existence of at least one cluster, determine a similarity to a representative plan of the at least one existing cluster;
 responsive to the plan being similar to the representative plan in the at least one cluster, add the plan to the at least one cluster;
 responsive to the plan failing to be similar to the representative plan in the at least one cluster, create a new cluster and add the plan to the new cluster such that the plan becomes the new cluster's representative plan; and
 responsive to the non-existence of the at least one cluster, create a new cluster and add the plan to the new cluster such that the plan becomes the new cluster's representative plan.

6. The computer program product of claim 5, wherein the computer readable program determines the similarity to the representative plan of the at least one existing cluster by causing the computing device to:
 compare the plans in the set of top-k plans as a comparison of a sequence of strings, wherein the comparison only considers a state transition sequence of each plan;
 view each state of a plan as a "token" in a string and the sequence of states as the string;
 using the sequence of states, determine a relationship between states to determine whether two plans in the set of top-k plans belong to a same cluster; and
 compute a similarity score as a minimum transformation cost required to convert one string to another string.

7. The computer program product of claim 1, wherein the computer readable program clusters each plan of the set of top-k plans by causing the computing device to:
 iterate over the top-k plans starting with a highest-quality plan;
 responsive to the existence of at least one cluster, determine a similarity to a plan in the at least one existing cluster;
 responsive to the plan being similar to an existing plan in the at least one cluster, add the plan to the at least one cluster;
 responsive to the plan failing to be similar to any existing plan in the at least one cluster, create a new cluster and add the plan to the new cluster such that the plan becomes the new cluster's representative plan; and
 responsive to the non-existence of the at least one cluster, create a new cluster and add the plan to the new cluster such that the plan becomes the new cluster's representative plan.

8. The computer program product of claim 1, wherein the computer readable program clusters each plan of the set of top-k plans by causing the computing device to:
 iterate over the top-k plans starting with a highest-quality plan;
 responsive to the existence of at least one cluster, determine a similarity, on average, to all the plans in the at least one existing cluster;
 responsive to the plan being similar, on average, to an existing plan in the at least one cluster, add the plan to the at least one cluster;
 responsive to the plan failing to be similar, on average, to any existing plan in the at least one cluster, create a new cluster and add the plan to the new cluster such that the plan becomes the new cluster's representative plan; and
 responsive to the non-existence of the at least one cluster, create a new cluster and add the plan to the new cluster such that the plan becomes the new cluster's representative plan.

9. An apparatus comprising:
 a processor; and
 a memory coupled to the processor, wherein the memory comprises instructions which, when executed by the processor, cause the processor to:
 receive a planning problem for testing and treatment of a patient in a hospital and an integer value k indicating a number of top plans to be identified for the planning problem;
 generate a set of top-k plans with at most size k, wherein the set of top-k plans is with respect to a given measure of plan quality, wherein the plan quality is measured by a cost of a plan, wherein each action in the plan is associated with an action cost encompassed in the cost of the plan, and wherein generating the set of top-k plans with at most k is performed by applying Eppstein's algorithm to find k shortest paths in a state graph from a node corresponding to an initial state to a goal node;
 cluster each plan in the set of top-k plans based on a similarity between plans such that each cluster contains similar plans and each plan is grouped only into one cluster thereby forming the set of top-m clusters; and
 present a representative plan from each top-m cluster to the user, wherein the representative plan is a minimum cost plan in the top-m cluster.

10. The apparatus of claim 9, wherein the planning problem includes a finite set of facts, the initial state, a finite set of action operators, and a goal condition.

11. The apparatus of claim 9, wherein the integer value k is at least one of a fixed integer or a function indicating a percentage of an optimal plan other identified plans must be within.

12. The apparatus of claim 9, wherein the instructions generate the top-k plans by causing the processor to:
 responsive to receiving a planning problem, add all initial state predicates to a reachable ground predicate set;
 responsive to finding a subset of the reachable ground predicate set that satisfies the precondition of one of the actions, add a new operator to a set of operators, add positive effects of the new operator to the reachable ground predicate set, and set an operator cost equal to action cost;
 responsive to a failure to find a subset of the reachable ground predicate set that satisfies the precondition of one of the actions, add the node corresponding to the initial state to the state graph;
 responsive to finding an operator that does not have a corresponding edge in the state graph, add a node corresponding to the state produced by the operator to the state graph, add an edge corresponding to the operator to the state graph, and set a cost of the edge equal to the operator cost;
 responsive to a failure to find an operator that does not have a corresponding edge in the state graph, add a new node to the state graph thereby forming the goal node, and connect every node corresponding to a goal state to the goal node with an edge of zero cost; and construct the set of top-k plans by traversing each path from the initial state to the goal state and adding an instance of the action for each operator corresponding to an edge in the path.

13. The apparatus of claim 9, wherein the instructions generate the top-k plans by causing the processor to:

responsive to receiving a top-k planning problem, create a new state graph consisting of one node corresponding to the initial state, add the initial state node to an unvisited list, and set a distance score of the initial node to zero;

select and remove a node with a lowest heuristic score, computed based on distance score, from the unvisited list, and add the selected node to a closed list;

responsive to finding a new operator that may be applied to the state of the selected node:
compute a new distance score of the state produced by the operator as the sum of the score of the selected node and the cost of the action;
responsive to determining that there is not a node corresponding to the produced state on unvisited list, add a node to the new state graph corresponding to the produced state to the unvisited list, assign the new distance score as the nodes distance score, and add a link to the new state graph that connects the selected state node and the produced state node corresponding to the action; and
responsive to determining that there is a node corresponding to the produced state on unvisited list, update the score of the produced node using the new score and add a link to the new state graph that connects the selected state node and the produced state node corresponding to the action;

responsive to the unvisited list being empty and responsive to the goal state being reached, or responsive to the unvisited list failing to be empty, the new state graph being expanded by preset percentage, and responsive to the goal state being reached, use the new state graph to construct the k shortest paths from the initial state to any goal state using Eppstein's k shortest paths algorithm;

responsive to a failure to identify k shortest paths, repeat the process until k-shortest paths are identified; and responsive to k shortest paths being found, for each found path, construct a plan by traversing the path from the initial state to the goal state, and add an instance of the action for each action corresponding to an edge in the path.

14. The apparatus of claim 9, wherein the instructions cluster each plan of the set of top-k plans by causing the processor to:

iterate over the top-k plans starting with a highest-quality plan;

responsive to the existence of at least one cluster, determine a similarity to a representative plan of the at least one existing cluster;

responsive to the plan being similar to the representative plan in the at least one cluster, add the plan to the at least one cluster;

responsive to the plan failing to be similar to the representative plan in the at least one cluster, create a new cluster and add the plan to the new cluster such that the plan becomes the new cluster's representative plan; and responsive to the non-existence of the at least one cluster, create a new cluster and add the plan to the new cluster such that the plan becomes the new cluster's representative plan.

15. The apparatus of claim 14, wherein the instructions determine the similarity to the representative plan of the at least one existing cluster by causing the processor to:

compare the plans in the set of top-k plans as a comparison of a sequence of strings, wherein the comparison only considers a state transition sequence of each plan;

view each state of a plan as a "token" in a string and the sequence of states as the string;

using the sequence of states, determine a relationship between states to determine whether two plans in the set of top-k plans belong to a same cluster; and compute a similarity score as a minimum transformation cost required to convert one string to another string.

16. The apparatus of claim 9, wherein the instructions cluster each plan of the set of top-k plans by causing the processor to:

iterate over the top-k plans starting with a highest-quality plan;

responsive to the existence of at least one cluster, determine a similarity to a plan in the at least one existing cluster;

responsive to the plan being similar to an existing plan in the at least one cluster, add the plan to the at least one cluster;

responsive to the plan failing to be similar to any existing plan in the at least one cluster, create a new cluster and add the plan to the new cluster such that the plan becomes the new cluster's representative plan; and responsive to the non-existence of the at least one cluster, create a new cluster and add the plan to the new cluster such that the plan becomes the new cluster's representative plan.

17. The apparatus of claim 9, wherein the instructions cluster each plan of the set of top-k plans by causing the processor to:

iterate over the top-k plans starting with a highest-quality plan;

responsive to the existence of at least one cluster, determine a similarity, on average, to all the plans in the at least one existing cluster;

responsive to the plan being similar, on average, to an existing plan in the at least one cluster, add the plan to the at least one cluster;

responsive to the plan failing to be similar, on average, to any existing plan in the at least one cluster, create a new cluster and add the plan to the new cluster such that the plan becomes the new cluster's representative plan; and responsive to the non-existence of the at least one cluster, create a new cluster and add the plan to the new cluster such that the plan becomes the new cluster's representative plan.

18. The apparatus of claim 9, where the planning problem is obtained by translating inputs to a hypotheses generation problem, a trace, and a state transition model.

19. The computer program product of claim 1, where the planning problem is obtained by translating inputs to a hypotheses generation problem, a trace, and a state transition model.

* * * * *